United States Patent
Yamamoto et al.

(10) Patent No.: US 10,739,320 B2
(45) Date of Patent: Aug. 11, 2020

(54) MASS SPECTROMETER

(71) Applicant: SHIMADZU CORPORATION, Kyoto-shi, Kyoto (JP)

(72) Inventors: Hideki Yamamoto, Kyoto (JP); Yoshikatsu Umemura, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/466,170

(22) PCT Filed: Dec. 15, 2016

(86) PCT No.: PCT/JP2016/087374
§ 371 (c)(1),
(2) Date: Jun. 3, 2019

(87) PCT Pub. No.: WO2018/109895
PCT Pub. Date: Jun. 21, 2018

(65) Prior Publication Data
US 2020/0003739 A1 Jan. 2, 2020

(51) Int. Cl.
*H01J 49/00* (2006.01)
*H01J 49/42* (2006.01)
(Continued)

(52) U.S. Cl.
CPC .............. *G01N 30/72* (2013.01); *G01N 27/62* (2013.01); *H01J 49/0045* (2013.01); *H01J 49/408* (2013.01); *H01J 49/42* (2013.01)

(58) Field of Classification Search
CPC .... G01N 30/72; H01J 49/0045; H01J 49/408; H01J 49/42
See application file for complete search history.

(56) References Cited

U.S. PATENT DOCUMENTS

2006/0255258 A1* 11/2006 Wang ................. G01N 30/8624
250/282
2014/0014833 A1 1/2014 Sekiya

FOREIGN PATENT DOCUMENTS

JP 2013-224858 A 10/2013

OTHER PUBLICATIONS

Communication dated Nov. 18, 2019, from the European Patent Office in application No. 16924115.5.
(Continued)

*Primary Examiner* — Nicole M Ippolito
*Assistant Examiner* — Sean M Luck
(74) *Attorney, Agent, or Firm* — Sughrue Mion, PLLC

(57) ABSTRACT

For a sample containing a target component, a product-ion scan measurement in which the m/z value of a known ion originating from the compound is designated as a precursor ion is performed in a measurement unit (1) to acquire profile spectrum data. A peak detector (22) in a data processing unit (2A) detects peaks on the profile spectrum. For each detected peak, a product-ion m/z-value acquirer (23) acquires an m/z value corresponding to the maximum intensity as the m/z value of a product ion. A pseudo MRM measurement data extractor (24) adopts the m/z value of the precursor ion and that of the product ion as an MRM transition, extracts the maximum intensity of the peak originating from the product ion as the signal intensity value on that MRM transition, and stores these data as pseudo MRM measurement data in a memory section (25). Thus, quantitative information which reflects the concentration of the target compound can be obtained by a simple product-ion scan measurement without performing an MRM measurement.

16 Claims, 9 Drawing Sheets

(51) Int. Cl.
*G01N 30/72* (2006.01)
*G01N 27/62* (2006.01)
*H01J 49/40* (2006.01)

(56) References Cited

OTHER PUBLICATIONS

Karine M. Clauwaert et al., "Investigation of the quantitative properties of the quadrupole orthogonal acceleration time-of-flight mass spectrometer with electrospray ionisation using 3,4 methylenedioxymethamphetamine", Rapid Communications in Mass Spectrometry, vol. 13, No. 14, XP055640215, Jul. 8, 1999, pp. 1540-1545 (6 pages total).
International Search Report of PCT/JP2016/087374 dated Mar. 14, 2017 [PCT/ISA/210].
Written Opinion of PCT/JP2016/087374 dated Mar. 14, 2017 [PCT/ISA/237].

* cited by examiner

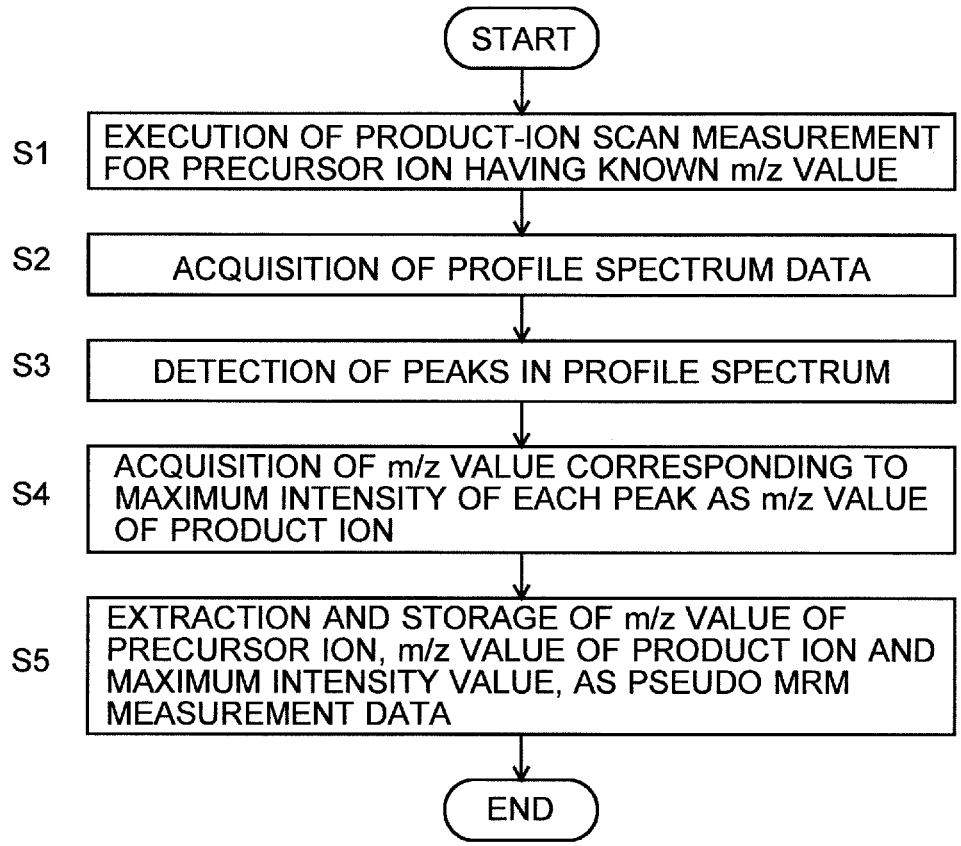
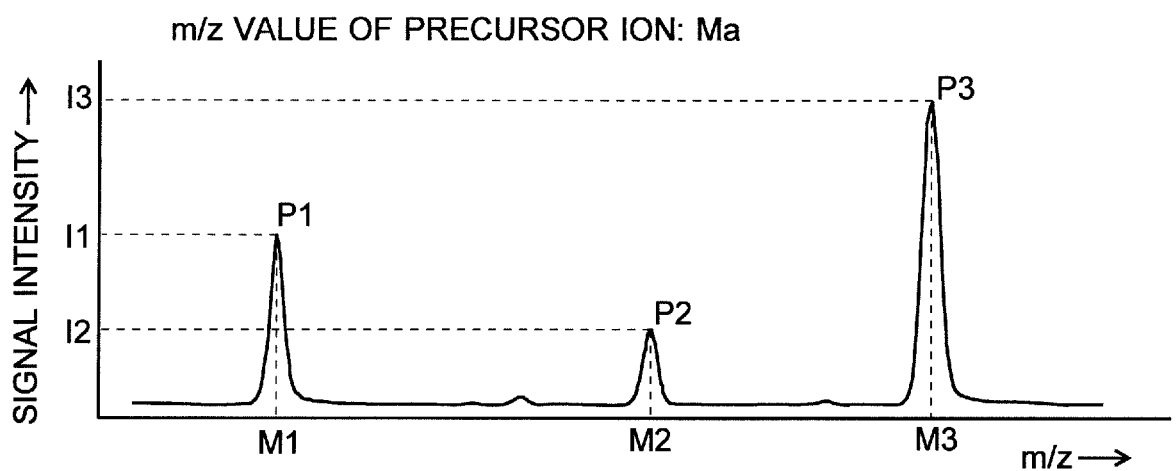

MASS SPECTROMETER

CROSS REFERENCE TO RELATED APPLICATIONS

This application is a National Stage of International Application No. PCT/JP2016/087374, filed Dec. 15, 2016.

TECHNICAL FIELD

The present invention relates to a mass spectrometer, and more specifically, to a mass spectrometer in which an ion selected by a front mass separator is dissociated by a collision cell, and the thereby generated product ions are separated according to their mass-to-charge ratios by a rear mass separator and detected, such as a triple quadrupole mass spectrometer or quadrupole time-of-flight mass spectrometer (which is hereinafter called the "Q-TOF mass spectrometer" according to conventional usage).

BACKGROUND ART

MS/MS analysis, which is one type of mass spectrometric technique, has been widely used for the identification, structural analysis or quantitative determination of a substance in a sample as well as for other analytical purposes. There are various configurations of mass spectrometers for performing MS/MS analyses. One type which is comparatively simple in structure as well as easy to operate and handle is a triple quadrupole mass spectrometer including a collision cell sandwiched between quadrupole mass filters located before and after the collision cell.

Commonly known modes for the MS/MS measurement by triple quadrupole mass spectrometers include a multiple reaction monitoring (MRM) measurement, product-ion scan measurement, precursor-ion scan measurement and neutral-loss scan measurement. In the MRM measurement mode, the mass-to-charge ratio of an ion which is allowed to pass through is fixed in each of the front and rear quadrupole mass filters so as to measure the intensity of a specific product ion for a specific precursor ion. In the MRM measurement, ion intensity signals can be obtained with high signal-to-noise ratios, since the two-stage mass separators remove ions or neutral particles which originate from compounds that are not the measurement target or originate from foreign components. Accordingly, the MRM measurement is particularly effective in such analyses as a quantitative determination of a trace amount of a component.

A triple quadrupole mass spectrometer configured in the preciously described manner may be used independently, although it is often used in combination with a liquid chromatograph (LC) or gas chromatograph (GC). A system which employs a triple quadrupole mass spectrometer as a detector for a GC or LC (such a system may hereinafter be called the GC-MS/MS, LC-MS/MS, etc. according to conventional usage) is commonly used for a quantitative analysis of a compound in a sample containing a considerable number of compounds or a sample containing foreign substances, as well as for similar analyses.

When an MRM measurement for a target sample is to be performed in a GC-MS/MS or LC-MS/MS, it is necessary to set an MRM transition as one of the measurement conditions and relate it to the retention time for a compound (component) as a measurement target in advance of the measurement of a target sample. An MRM transition is the combination of the mass-to-charge ratio of a target precursor ion and that of a target product ion. By setting the most suitable MRM transition for each target compound, the signal intensity of an ion originating from each target compound can be obtained with a high level of accuracy and sensitivity, so that the quantity of the compound can also be determined with a high level of accuracy and sensitivity.

In a normal situation, dissociating an ion derived from one compound yields a plurality of kinds of product ions. Accordingly, there are a plurality of possible combinations of the precursor ion and product ion for the MRM measurement of one compound, among which an appropriate combination should preferably be selected as the MRM transition, such as the one which yields the highest level of signal intensity. Accordingly, in a conventional measurement procedure, a product-ion scan measurement for a sample containing a target compound is initially performed, and MRM measurement conditions including the MRM transition are determined based on the result of this measurement. An MRM measurement for the sample containing the target compound is subsequently performed under the determined MRM measurement conditions, and the quantity of the target compound is determined based on the result of this measurement.

For example, Patent Literature 1 discloses a device which is configured to simplify the task of setting measurement conditions for a product-ion scan measurement (e.g. the mass scan range for the product ions). Specifically, an operator specifies a target compound by a clicking operation (or the like) on a compound information table displayed on a display screen. In response to this operation, the device automatically creates measurement conditions for the product-ion scan measurement for the specified compound. While such efforts have been made to simplify the task to be performed by operators, it is necessary to perform two measurements for one sample, i.e. the product-ion scan measurement and the MRM measurement, in order to acquire quantitative information which corresponds to the content of a target compound in a sample. Therefore, the measurement task is cumbersome, and it is difficult to improve the efficiency of the analysis.

In the case where the compound contained in a sample is unknown, it is impossible to specify a target compound on the compound information table mentioned earlier. In such a case, it is necessary to initially acquire a mass spectrum by a normal scan measurement (i.e. a measurement with no dissociation of an ion) in order to determine the kind of compound contained in the sample. Therefore, the measurement task will be even more cumbersome since there are three measurements to be performed for one sample, i.e. the normal scan measurement, product-ion scan measurement and MRM measurement.

As described earlier, a product ion which satisfies a specific condition, e.g. which yields the highest signal intensity, is selected as the MRM transition from the result of the product-ion scan measurement performed on the target compound. However, this MRM transition is not always the most suitable MRM transition for the quantitative determination of the target compound due to the following reason: When a calibration curve for the quantitative determination is prepared, a result of an MRM measurement performed for samples which respectively contain the target compound at different levels of concentration is used. The error of a calibration curve prepared from a result of an MRM measurement performed under the MRM transition determined in the previously described manner is not always smaller than the error of a calibration curve prepared based on a result of an MRM measurement performed under a different MRM transition.

CITATION LIST

Patent Literature

Patent Literature 1: JP 2013-224858 A

SUMMARY OF INVENTION

Technical Problem

The present invention has been developed to solve the previously described problem. Its primary objective is to provide a mass spectrometer which can obtain information equivalent to an MRM measurement result after a product-ion scan measurement is performed, without subsequently performing an MRM measurement. Another objective of the present invention is to provide a mass spectrometer which can acquire information equivalent to an MRM measurement result with a satisfactory level of quantitative quality based on a result of a product-ion scan measurement, without requiring the execution of an MRM measurement.

Solution to Problem

The present invention developed for solving the previously described problem is a mass spectrometer including a front mass separator and a rear mass separator between which a collision cell for dissociating an ion is located, the mass spectrometer further including:
  a) a product-ion scan measurement execution controller for controlling each of the front mass separator, the rear mass separator and the collision cell so as to acquire a profile spectrum over a predetermined mass-to-charge-ratio range by executing a product-ion scan measurement in which a known ion originating from a target compound in a sample is designated as a precursor ion;
  b) a peak detector for detecting a peak according to a predetermined criterion on the profile spectrum or on a centroid spectrum derived from the profile spectrum;
  c) a product-ion mass-to-charge-ratio value determiner for determining a mass-to-charge-ratio value of a product ion to be combined with a mass-to-charge-ratio value of the precursor ion and be treated as an MRM transition, based on one or more mass-to-charge-ratio values within a mass-to-charge-ratio range within which the peak or peaks detected from the profile spectrum is present, or based on one or more mass-to-charge-ratio values corresponding to the peak or peaks detected from the centroid spectrum; and
  d) a pseudo MRM measurement result extractor for extracting, as a pseudo MRM measurement result, the mass-to-charge-ratio value of the precursor ion, the mass-to-charge-ratio value of the product ion determined by the product-ion mass-to-charge-ratio value determiner, and an intensity value derived from the peak or peaks detected from the profile spectrum or the centroid spectrum.

The mass separator on the front side of the collision cell is typically a quadrupole mass filter, whereas the mass spectrometer on the rear side of the collision cell is normally a quadrupole mass filter or time-of-flight mass separator. That is to say, a typical form of the mass spectrometer according to the present invention is a triple quadrupole mass spectrometer or Q-TOF mass spectrometer. The mass spectrometer according to the present invention may be combined with a GC or LC; i.e. it may be used as a detector for a GC or LC, but is not limited to this configuration. For example, the present invention may also be used in the case of using a flow injection method to introduce a liquid sample into a mass spectrometer which is capable of a mass spectrometric analysis of a compound in a liquid sample.

In the case where the rear mass separator is a time-of-flight mass separator, the mass spectrometer normally detects ions over a predetermined range of mass-to-charge ratios. In such a case, the normal measurement effectively corresponds to the scan measurement, and the mass spectrum acquired by the normal measurement corresponds to the profile spectrum.

For example, an operator sets, as a precursor ion, the mass-to-charge-ratio value of a known ion originating from a target compound contained in a sample and issues a command to execute the measurement. Then, the product-ion scan measurement execution controller controls an ion source, mass separators, a detector and other relevant sections so as to perform a product-ion scan measurement over a predetermined mass-to-charge-ratio range for the specified precursor ion. A profile spectrum which shows an intensity change of the product ions over the predetermined mass-to-charge-ratio range is thereby obtained.

According to a predetermined criterion, the peak detector detects a peak originating from a product ion of the target compound on the profile spectrum or on a centroid spectrum derived from the profile spectrum.

The product-ion mass-to-charge-ratio value determiner determines the mass-to-charge-ratio value of the product ion based on the detected peak. In the case of utilizing a peak detected from a profile spectrum, the peak has a certain width. In such a case, the mass-to-charge ratio corresponding to a specific position in the peak, a typical example of which is the peak-top position, can be used as the mass-to-charge-ratio value of the product ion. Alternatively, since a peak normally includes a plurality of data points, a mass-to-charge-ratio value may be calculated from all or some of those data points, and the obtained value may be used as the mass-to-charge-ratio value of the product ion. In the case of utilizing the peak or peaks detected from a centroid spectrum, the peak is a linear peak. Accordingly, the mass-to-charge ratio corresponding to one centroid peak can be used as the mass-to-charge-ratio value of the product ion. Alternatively, the mass-to-charge-ratio value of the product ion may be calculated from mass-to-charge ratios corresponding to a plurality of centroid peaks.

Based on the peak or peaks detected from the profile spectrum or centroid spectrum, the pseudo MRM measurement result extractor determines an intensity value corresponding to an MRM transition which is the combination of the mass-to-charge-ratio value of the precursor ion used in the measurement and the mass-to-charge-ratio value of the product ion determined in the previously described manner. In the case of utilizing a peak detected from a profile spectrum, the intensity at the peak top of the detected peak (maximum intensity) may be used as the aforementioned intensity value, or the intensity value may be calculated from the intensities at a plurality of data points forming one peak in the previously described manner. Similarly, in the case of utilizing a centroid peak, the peak intensity of one centroid peak may be used as the aforementioned intensity value, or the intensity value may be calculated from the peak intensities of a plurality of centroid peaks.

In this manner, a pseudo MRM measurement result including a mass-to-charge-ratio value of a precursor ion, a mass-to-charge-ratio value of a product ion and an intensity value can be extracted from the result of a product-ion scan measurement for a sample containing a target compound. If there are a plurality of different product ions for which mass-to-charge-ratio values have been determined by the product-ion mass-to-charge-ratio value determiner, an intensity value can be determined for each of the different MRM transitions. Consequently, a plurality of pseudo MRM measurement results will be obtained from one product-ion scan measurement result.

As a preferable configuration, the mass spectrometer according to the present invention may further include a calibration curve creator for creating a calibration curve showing a relationship between concentration and intensity value, based on pseudo MRM measurement results respectively obtained for the same target compound at different levels of concentration using the same precursor-ion mass-to-charge ratio and the same product-ion mass-to-charge ratio.

With this configuration, a calibration curve for the quantitative determination of a target compound can be determined based on the results of a product-ion scan measurement obtained for a plurality of samples which contain the target compound at different levels of concentration.

In a more preferable mode of the mass spectrometer according to the present invention, the calibration curve creator is configured to create a plurality of calibration curves based on pseudo MRM measurement results obtained for the same target compound using different precursor-ion mass-to-charge ratios and/or different product-ion mass-to-charge ratios, and select a calibration curve estimated to be the most reliable among the plurality of calibration curves.

This mass spectrometer may further include an MRM transition extractor for extracting, as an MRM transition, the combination of a precursor ion and a product ion which gives the selected calibration curve.

For example, the "calibration curve estimated to be the most reliable" may be a linear calibration line which is drawn based on a plurality of data points showing a relationship between concentration and intensity value, and one which gives the smallest amount of error or variance of the data points from the calibration line.

According to the previously described configuration, if a plurality of MRM transitions have been extracted based on a product-ion scan measurement result, an MRM transition which yields a satisfactory level of quantitative quality can be identified among those MRM transitions, and a calibration curve on the selected MRM transition can be determined.

Advantageous Effects of Invention

In the mass spectrometer according to the present invention, after a product-ion scan measurement for a sample containing a target compound has been performed, a quantitative determination result which is equivalent to a result obtained by an MRM measurement can be obtained without requiring an MRM measurement to be performed under an MRM transition determined from the result of the product-ion scan measurement. It is unnecessary to perform the cumbersome task of performing an MRM measurement after determining an MRM transition and other conditions for the MRM measurement by a product-ion scan measurement. Accordingly, quantitative analyses for various compounds can be efficiently carried out. A quantitative determination result which is equivalent to a result obtained by an MRM measurement can also be obtained in a Q-TOF mass spectrometer, in which an MRM measurement with a specific MRM transition designated as the target is not normally performed.

In the preferable configurations of the mass spectrometer according to the present invention, if the presence of a plurality of MRM transitions for a target compound has been revealed by a product-ion scan measurement, an MRM transition which yields a satisfactory level of quantitative quality can be identified among those MRM transitions, and a calibration curve on the selected MRM transition can be determined.

BRIEF DESCRIPTION OF DRAWINGS

FIG. 2 is a flowchart of the process of acquiring pseudo MRM measurement data in the mass spectrometer according to the first embodiment.

FIG. 3 is a diagram illustrating how to acquire pseudo MRM measurement data in the mass spectrometer according to the first embodiment.

DESCRIPTION OF EMBODIMENTS

First Embodiment

Figure 1:
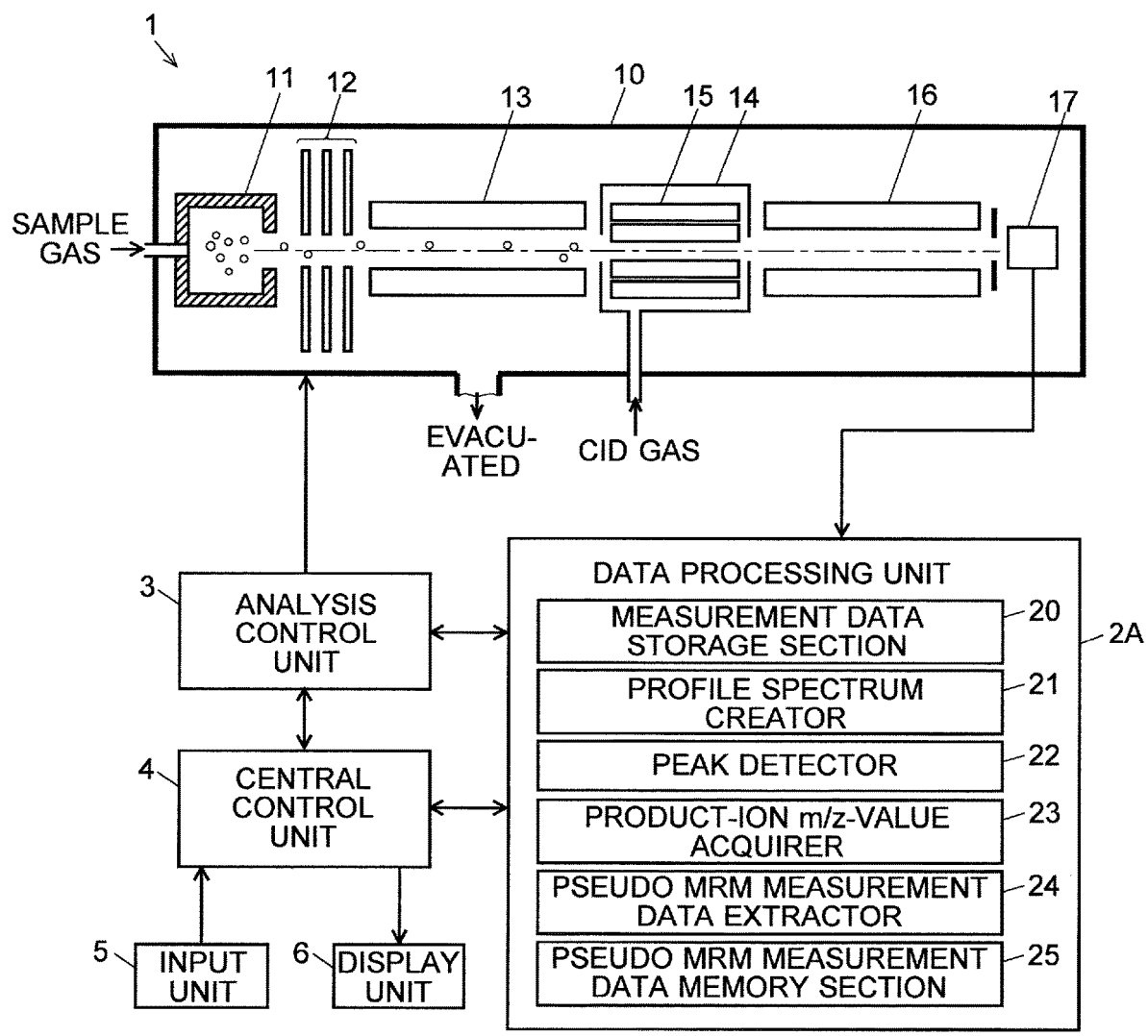
FIG. 1 is a schematic configuration diagram of a mass spectrometer according to the first embodiment of the present invention.

A mass spectrometer as the first embodiment of the mass spectrometer according to the present invention is hereinafter described with reference to FIGS. 1-3. FIG. 1 is a schematic configuration diagram of the mass spectrometer according to the first embodiment. The mass spectrometer according to the first embodiment (and those in the second through fifth embodiments, which will be described later) is a triple quadrupole mass spectrometer.

As shown in FIG. 1, a measurement unit 1 includes an ion source 11 employing an electron ionization (EI) or similar ionization method, an ion lens 12, a front quadrupole mass filter 13, a collision cell 14 with a multipole ion guide 15 contained inside, a rear quadrupole mass filter 16, and an ion detector 17, which are all contained in a vacuum chamber 10 evacuated with a vacuum pump (not shown).

When an MS/MS analysis is performed, collision induced dissociation (CID) gas is supplied into the collision cell 14. Sample gas containing a compound which is a measurement target is introduced into the ion source 11, whereupon the compound molecules in the sample gas are turned into ions. The ions are converged by the ion lens 12 and sent into the front quadrupole mass filter 13. Predetermined voltages are respectively applied to the four rod electrodes forming the front quadrupole mass filter 13. Among the various ions generated by the ion source 11, only an ion having a specific mass-to-charge ratio corresponding to those voltages is allowed to pass through the front quadrupole mass filter 13 and enter the collision cell 14. The ion derived from the compound comes into contact with the CID gas and is dissociated, whereby various product ions are generated. Predetermined voltages are respectively applied to the four rod electrodes forming the rear quadrupole mass filter 16. Only a product ion having a specific mass-to-charge ratio corresponding to those voltages is allowed to pass through the rear quadrupole mass filter 16 and reach the ion detector 17. For example, a combination of a conversion dynode and an electron multiplier is used as the ion detector 17.

The ion detector 17 produces a detection signal (ion intensity signal) corresponding to the amount of ions which have arrived at the detector. The detection signal is converted into digital data by an analogue-to-digital converter (not shown) and sent to a data processing unit 2A.

The data processing unit 2A includes a measurement data storage section 20, profile spectrum creator 21, peak detector 22, product-ion m/z-value acquirer 23, pseudo MRM measurement data extractor 24, pseudo MRM measurement data memory section 25 and other functional blocks. Each section of the measurement unit 1 is controlled by an analysis control unit 3. Operations of the analysis control unit 3 and those of the data processing unit 2A are generally controlled by a central control unit 4. An input unit 5 and a display unit 6 serving as user interfaces are connected to the central control unit 4.

All or some of the functions of the data processing unit 2A, analysis control unit 3 and central control unit 4 can be configured to be realized by using a personal computer (or more sophisticated workstation) as a hardware resource and executing, on this computer, dedicated controlling-processing software previously installed on the same computer.

A characteristic measurement operation and data-processing operation in the mass spectrometer according to the present embodiment are hereinafter described with reference to FIGS. 2 and 3. FIG. 2 is a flowchart of the process of acquiring pseudo MRM measurement data in the mass spectrometer according to the present embodiment. FIG. 3 is a diagram showing one example of the profile spectrum for explaining the same process.

For the present embodiment, it is assumed that the target compound in a sample to be subjected to the measurement is previously determined, and the precursor ion of the target compound has a known m/z value. In the case where the m/z value of the precursor ion of the target compound is unknown, the m/z value of an ion which is suitable as the precursor ion can be determined beforehand by a normal scan measurement in which no dissociation of an ion is performed within the collision cell 14. In some cases, there may be no previously determined target compound, and the quantity of an unknown compound in a sample being subjected to the measurement needs to be determined. The normal scan measurement can also be performed in such a case to determine the m/z value of an ion originating from the unknown compound. The compound may also be identified as needed (although the identification is not essential for quantitative determination).

An operator enters the m/z value of the precursor ion of the target compound (in the present example, m/z=Ma) and the measurement conditions of the product-ion scan measurement through the input unit 5. The measurement conditions include the m/z range of the product-ion scan measurement as well as the CID conditions, such as the pressure of the CID gas and the amount of collision energy. Some or all of those measurement conditions may have default values.

The operator subsequently issues a command to execute the measurement. Then, the analysis control unit 3 receives instructions from the central control unit 4 and controls each relevant section according to the set measurement conditions to carry out a product-ion scan measurement for the specified precursor ion having the m/z value of Ma (Step S1). During the measurement, a series of profile spectrum data showing a change in the signal intensity of the product ions over the predetermined m/z range are sent to the data processing unit 2A. Those data are temporarily stored in the measurement data storage section 20 (Step S2).

After the acquisition of the data, the profile spectrum creator 21 creates a profile spectrum based on the data stored in the measurement data storage section 20. In many cases, a plurality of kinds of product ions having different m/z values are generated from one kind of precursor ion by CID. Therefore, a plurality of peaks corresponding to different product ions appear on the profile spectrum, as shown in FIG. 3. The peak detector 22 detects those peaks on the profile spectrum according to a predetermined algorithm, and determines the signal intensity (maximum intensity) at the peak top of each peak (Step S3). In the example of FIG. 3, three peaks P1, P2 and P3 are detected, and their respective intensities I1, I2 and I3 are determined.

Next, for each detected peak, the product-ion m/z-value acquirer 23 determines the m/z value at which the maximum intensity of that peak has been obtained, and acquires that m/z value as the m/z value of the corresponding product ion (Step S4). In the example of FIG. 3, M1, M2 and M3 are obtained as the m/z values of the product ions for the peaks P1, P2 and P3, respectively. The pseudo MRM measurement data extractor 24 extracts, as pseudo MRM measurement data, an MRM transition which is the combination of the m/z value of the precursor ion and the m/z value of one of the product ions as well as the signal intensity of the product ion for the MRM transition (Step S5).

The number of obtained MRM transitions is the same as that of the peaks detected in the profile spectrum. In the example of FIG. 3, since three peaks are detected, three MRM transitions Ma>M1, Ma>M2 and Ma>M3 corresponding to those peaks are obtained, with signal intensities I1, I2 and I3 obtained for the three MRM transitions, respectively. These signal intensity values are equivalent to the results obtained by performing an MRM measurement for the target compound at three MRM transitions Ma>M1, Ma>M2 and Ma>M3, respectively. The pseudo MRM measurement data extracted in this manner are stored in the pseudo MRM measurement data memory section 25. Thus, the entire measurement is completed.

As described to this point, the mass spectrometer according to the first embodiment can acquire a pseudo MRM measurement result for a measurement target compound based on the result of a product-ion scan measurement for the same compound. The m/z range within which a product-ion scan measurement is performed is normally set to be lower than the m/z value of the precursor ion. However, the m/z range within which the product-ion scan measurement is performed may be expanded to a range higher than the m/z value of the precursor ion so that an MRM transition can be located and a signal intensity value on that MRM transition can be obtained even when the m/z value of a product ion exceeds the m/z value of the precursor ion due to a decrease in the number of the charge of the ion through the CID process.

Second Embodiment

A mass spectrometer as the second embodiment of the present invention is hereinafter described with reference to FIGS. 4-6.

Figure 4:
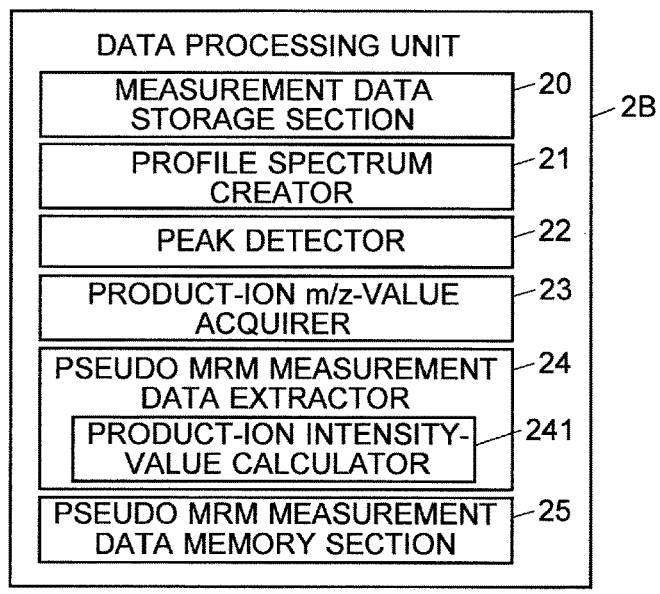
FIG. 4 is a configuration diagram of the functional blocks of a data processing unit in a mass spectrometer according to the second embodiment.
Figure 5:
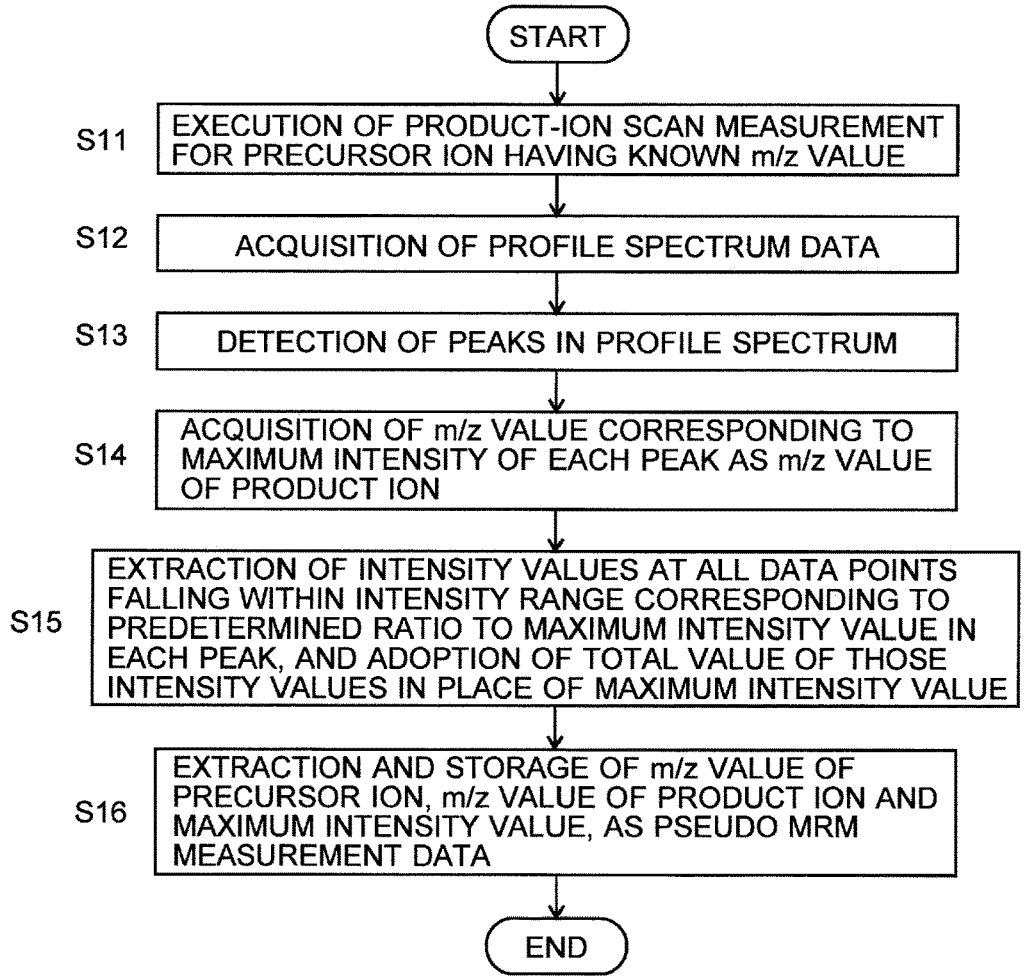
FIG. 5 is a flowchart of the process of acquiring pseudo MRM measurement data in the mass spectrometer according to the second embodiment.

FIG. 4 is a configuration diagram showing the functional blocks of the data processing unit 2B in the mass spectrometer according to the second embodiment. FIG. 5 is a flowchart of the process of acquiring pseudo MRM measurement data in the mass spectrometer according to the second embodiment. FIG. 6 is a diagram showing one example of the profile spectrum for explaining the same process. The basic configuration of the measurement unit 1 is the same as in the mass spectrometer according to the first embodiment, and therefore, will not be described.

As shown in FIG. 4, in the mass spectrometer according to the second embodiment, the pseudo MRM measurement data extractor 24 in the data processing unit 2B has a product-ion intensity-value calculator 241.

Once again, it is assumed that the target compound in a sample to be subjected to the measurement is previously determined, and the precursor ion of the target compound has a known m/z value. The processes in Steps S11 through S14 in FIG. 4 are the same as those of the already described Steps S1 through S4 in FIG. 2, and therefore, will not be described. After the completion of the process in Step S14, the product-ion intensity-value calculator 241 extracts, for each peak, all data points at which the signal intensity values fall within an intensity range corresponding to a predetermined ratio to the maximum intensity. There may be only one data point in some cases, or a plurality of data points in other cases. The predetermined ratio may be a preset value, or operators (users) may be allowed to freely set the ratio. The product-ion intensity-value calculator 241 totals the signal intensity values at the extracted data points for each peak, and adopts the total value in place of the maximum intensity value of the peak (Step S15).

The pseudo MRM measurement data extractor 24 extracts, as pseudo MRM measurement data, an MRM transition which is the combination of the m/z value of the precursor ion and the m/z value of one of the product ions as well as the aforementioned total value as the signal intensity of the product ion for the MRM transition, and stores the extracted data in the pseudo MRM measurement data memory section 25 (Step S16).

Figure 6:
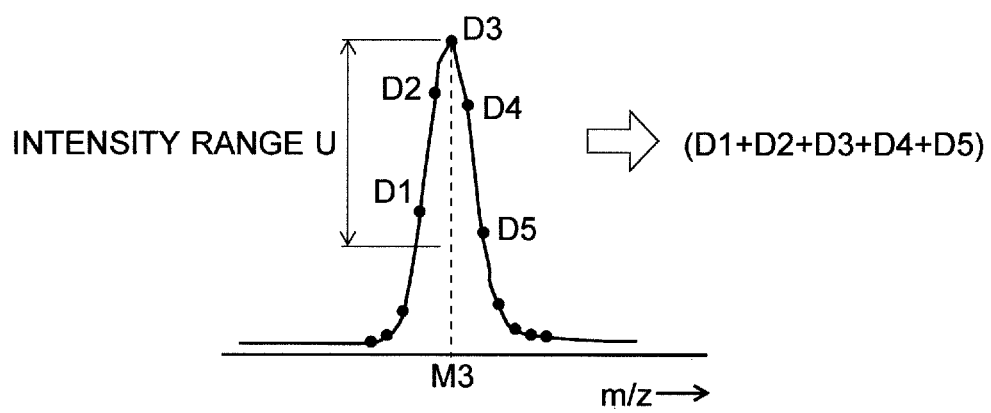
FIG. 6 is a diagram illustrating how to acquire pseudo MRM measurement data in the mass spectrometer according to the second embodiment.

Referring to the example shown in FIG. 6, the process performed by the product-ion intensity-value calculator 241 is specifically described. In FIG. 6, the filled circles represent actual data points. Suppose that data point D3 indicates the maximum intensity of the peak, and the intensity range U corresponding to the predetermined ratio to the maximum intensity has been determined as indicated in FIG. 6. In this case, there are four data points D1, D2, D4 and D5 at which the signal intensities fall within the intensity range U in addition to the data point D3. Accordingly, these data points D1, D2, D3, D4 and D5 are extracted and the signal intensity values at those points are totaled. The total value is used in place of the maximum intensity value of the peak. For example, if there is no data point falling within the intensity range U other than the data point D3, the signal intensity at the data point D3 will be directly used.

The mass spectrometer according to the second embodiment is particularly useful in such a case where the overall sensitivity is low, or in other words, the peaks on the profile spectrum are generally low due to such reasons as the compound being comparatively low in concentration or difficult to be ionized.

The m/z value of the product ion does not always need to be an m/z value which gives the maximum intensity of the corresponding peak. For example, it may be a mean value of the m/z values of the data points at both ends of the group of data points which fall within the intensity range U (in the example of FIG. 6, D1 and D5), or the median of the group of data points.

Third Embodiment

A mass spectrometer as the third embodiment of the present invention is hereinafter described with reference to FIGS. 7-9.

Figure 7:
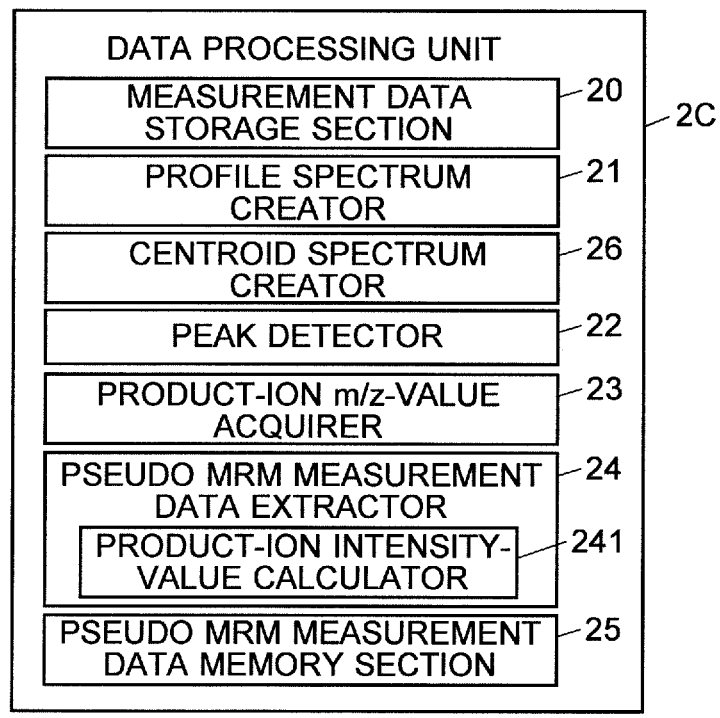
FIG. 7 is a configuration diagram of the functional blocks of a data processing unit in a mass spectrometer according to the third embodiment.

FIG. 7 is a configuration diagram showing the functional blocks of the data processing unit 2C in the mass spectrometer according to the third embodiment. FIG. 8 is a flowchart of the process of acquiring pseudo MRM measurement data in the mass spectrometer according to the third embodiment. FIG. 9 is a diagram showing one example of the profile spectrum for explaining the same process. The basic configuration of the measurement unit 1 is the same as in the mass spectrometer according to the first embodiment, and therefore, will not be described.

As shown in FIG. 7, the data processing unit 2C in the mass spectrometer according to the third embodiment has a centroid spectrum creator 26.

Figure 8:
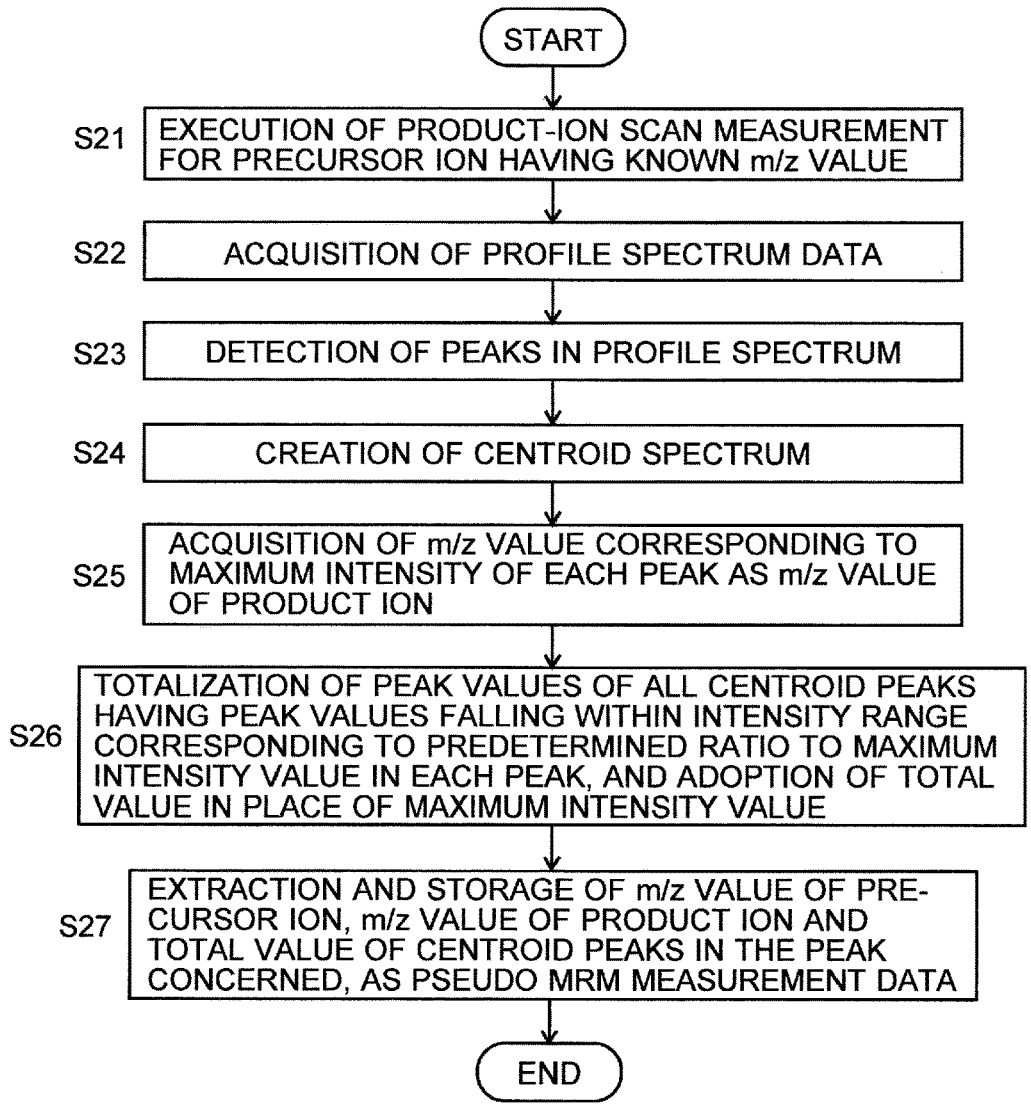
FIG. 8 is a flowchart of the process of acquiring pseudo MRM measurement data in the mass spectrometer according to the third embodiment.

The processes in Steps S21 through S23 in FIG. 8 are the same as those of the already described Steps S1 through S3 in FIG. 2, and therefore, will not be described. The centroid spectrum creator 26 performs the centroid processing on the profile spectrum data to create a centroid spectrum in which centroid peaks in the form of vertical rods are observed (Step S24). It is evident that this processing in Step S24 may be performed before Step S22 or S23. The product-ion m/z-value acquirer 23 subsequently acquires the m/z value of each product ion in a similar manner to Step S4 or S14 (Step S25).

Subsequently, for each peak detected in Step S23, the product-ion intensity-value calculator 241 extracts all centroid peaks whose signal intensity values fall within an intensity range corresponding to a predetermined ratio to the maximum intensity. There may be only one centroid peak in some cases, or a plurality of centroid peaks in other cases. The predetermined ratio may be a preset value, or operators (users) may be allowed to freely set the ratio. The product-ion intensity-value calculator 241 totals the signal intensity values of the extracted centroid peaks for each peak detected in Step S23, and adopts the total value in place of the maximum intensity value of the peak (Step S26). It is also possible to extract centroid peaks whose signal intensity values are equal to or higher than a predetermined threshold in place of the centroid peaks whose signal intensity values fall within an intensity range corresponding to a predetermined ratio to the maximum intensity. Once again, the predetermined threshold may be a preset value, or operators (users) may be allowed to freely set the threshold.

Figure 9:
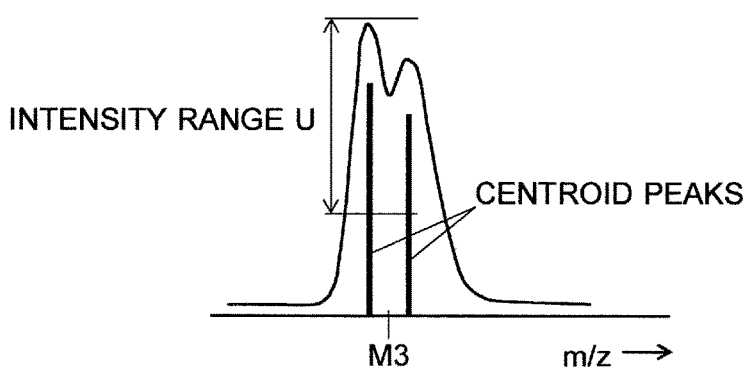
FIG. 9 is a diagram illustrating how to acquire pseudo MRM measurement data in the mass spectrometer according to the third embodiment.

As shown in FIG. 9, when there are a plurality of peaks considerably overlapping each other, those peaks may be detected as a single peak by a peak detection process based on the profile spectrum, while centroid peaks may be individually observed for each overlapping peak. In such a case, there are a plurality of centroid peaks whose signal intensity values fall within the intensity range U corresponding to a predetermined ratio to the maximum intensity. Accordingly, the signal intensity values of those centroid peaks can be totaled.

The m/z value of the product ion does not always need to be an m/z value which gives the maximum intensity of the corresponding peak. If there is only one centroid peak, the m/z value of that centroid peak may be used. If there are a plurality of centroid peaks, an average, median or similar value of the m/z values of those centroid peaks may be used.

Fourth Embodiment

A mass spectrometer as the fourth embodiment of the present invention is hereinafter described with reference to FIGS. 10-12.

Figure 10:
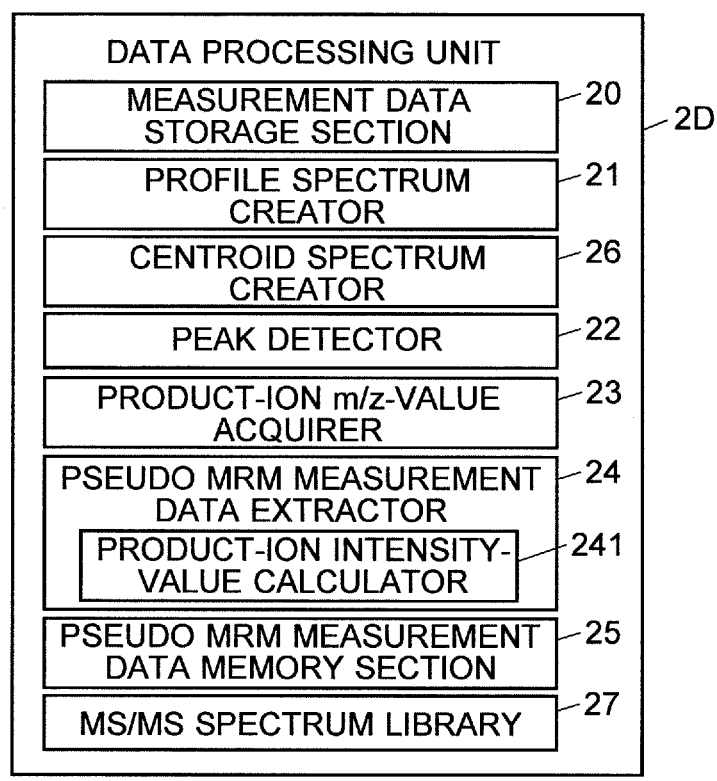
FIG. 10 is a configuration diagram of the functional blocks of a data processing unit in a mass spectrometer according to the fourth embodiment.

FIG. 10 is a configuration diagram showing the functional blocks of the data processing unit 2D in the mass spectrometer according to the fourth embodiment. FIG. 11 is a flowchart of the process of acquiring pseudo MRM measurement data in the mass spectrometer according to the fourth embodiment. FIG. 12 is a diagram showing one example of the profile spectrum for explaining the same process. The basic configuration of the measurement unit 1 is the same as in the mass spectrometer according to the first embodiment, and therefore, will not be described.

As shown in FIG. 10, the data processing unit 2D in the mass spectrometer according to the fourth embodiment has an MS/MS spectrum library 27 holding MS/MS spectra (product-ion spectra) for various compounds. Those MS/MS spectra are centroid spectra.

Figure 11:
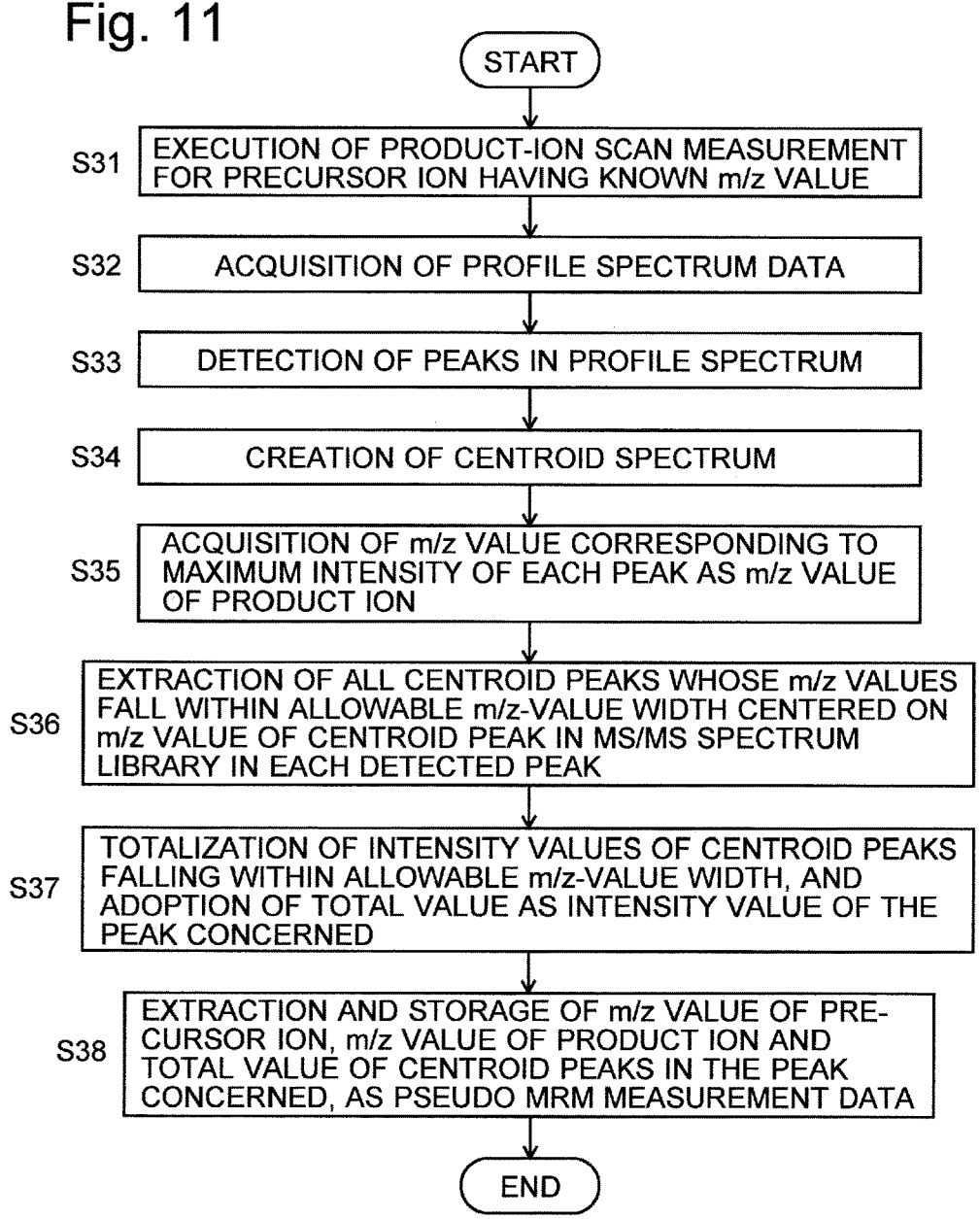
FIG. 11 is a flowchart of the process of acquiring pseudo MRM measurement data in the mass spectrometer according to the fourth embodiment.

The processes in Steps S31 through S35 in FIG. 11 are the same as those of the already described Steps S21 through S25 in FIG. 8, and therefore, will not be described.

For each peak detected in Step S33, the product-ion intensity-value calculator 241 locates a centroid peak corresponding to the peak and attempts to identify the centroid peak by comparing the m/z value of the centroid peak with the MS/MS spectra in the MS/MS spectrum library 27. Then, the product-ion intensity-value calculator 241 obtains the accurate m/z value for the identified centroid peak from the MS/MS spectrum library 27, determines a predetermined allowable m/z-value width centered on that m/z value, and extracts centroid peaks which fall within the allowable m/z-value width in the centroid spectrum in question. There may be only one centroid peak in some cases, or a plurality of centroid peaks in other cases. The m/z-value width of the predetermined allowable m/z-value width may be a preset value, or operators (users) may be allowed to freely set the width. The product-ion intensity-value calculator 241 totals the signal intensity values of the extracted centroid peaks for each peak detected in Step S33, and adopts the total value in place of the maximum intensity value of the peak (Step S36).

Figure 12:
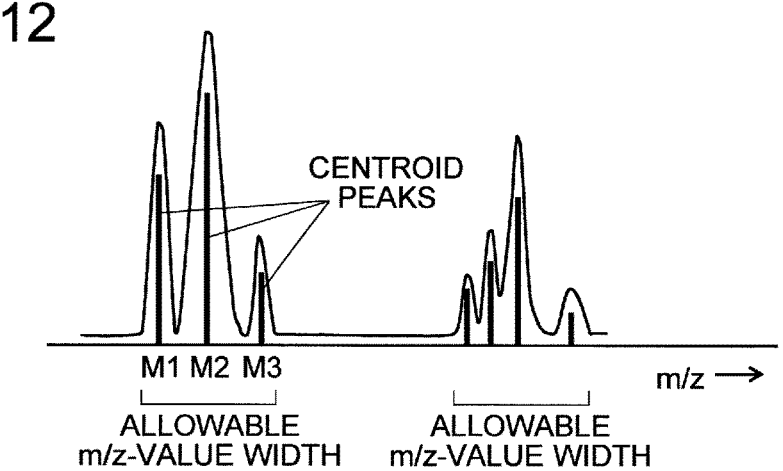
FIG. 12 is a diagram illustrating how to acquire pseudo MRM measurement data in the mass spectrometer according to the fourth embodiment.

Isotopic peaks which originate from the same compound (i.e. a group of peaks having the same elementary composition yet different mass-to-charge ratios) appear close to each other (e.g. at intervals of 1 Da) on the profile spectrum, as shown in FIG. 12. Accordingly, if the allowable m/z-value width is appropriately set so as to include isotopic peaks originating from the same compound, the signal intensity values of a plurality of centroid peaks corresponding to isotopic peaks will be totaled, and the total value can be used as quantitative information.

Fifth Embodiment

A mass spectrometer as the fifth embodiment of the present invention is hereinafter described with reference to FIGS. 13 and 14.

Figure 13:
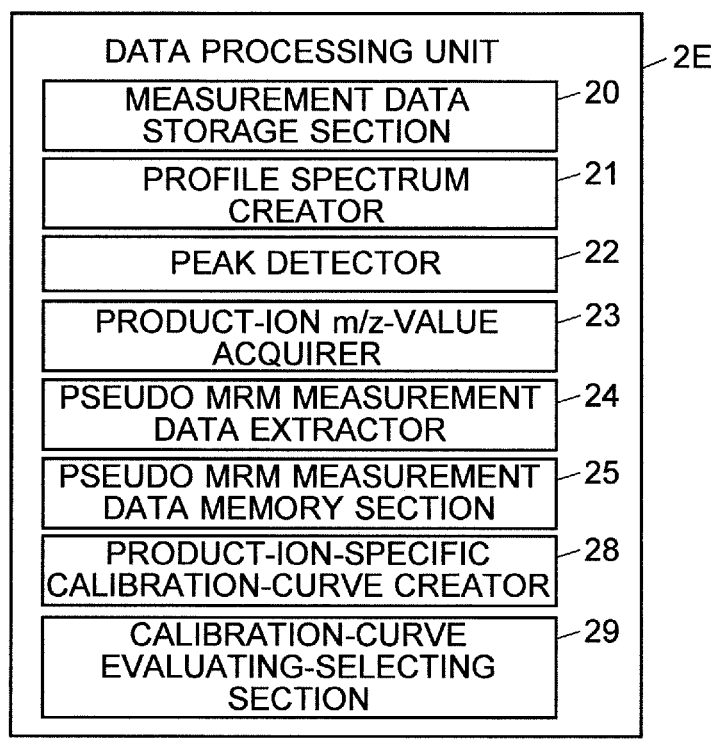
FIG. 13 is a configuration diagram of the functional blocks of a data processing unit in a mass spectrometer according to the fifth embodiment.
Figure 14:
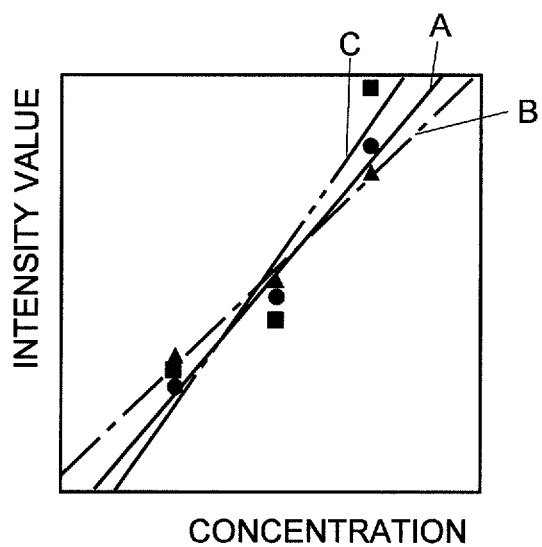
FIG. 14 is a diagram illustrating a calibration curve selection process in the mass spectrometer according to the fifth embodiment.

FIG. 13 is a configuration diagram showing the functional blocks of the data processing unit 2E in the mass spectrometer according to the fifth embodiment. FIG. 14 is a diagram illustrating a calibration curve selection process in the mass spectrometer according to the fifth embodiment. The basic configuration of the measurement unit 1 is the same as in the mass spectrometer according to the first embodiment, and therefore, will not be described.

As shown in FIG. 13, the data processing unit 2E in the mass spectrometer according to the fifth embodiment has a product-ion-specific calibration curve creator 28 and a calibration-curve evaluating-selecting section 29 in addition to the components of the data processing unit 2A in the mass spectrometer according to the first embodiment.

As described earlier, in the mass spectrometers according to the first through fourth embodiments, pseudo MRM measurement data is obtained by performing a measurement on sample gas containing a measurement target compound and processing the thereby obtained data. Signal intensity values on one MRM transition acquired in the data processing reflect concentration information of the measurement target compound in the sample gas. Accordingly, a plurality of sets of pseudo MRM measurement data for the target compound at different levels of concentration can be obtained by repeatedly performing the measurement and data processing for gas samples containing the measurement target compound at a plurality of levels of concentration (not less than three levels). In the mass spectrometer according to the fifth embodiment, after the pseudo MRM measurement data obtained in the previously described manner are stored in the pseudo MRM measurement data memory section 25, a characteristic process is performed as follows.

The product-ion-specific calibration-curve creator 28 creates a linear calibration line showing a relationship between concentration and intensity value, based on signal intensity values at different levels of concentration on the same MRM transition. As noted earlier, a plurality of MRM transitions are normally determined for one target compound. The product-ion-specific calibration-curve creator 28 creates a calibration line for each of those MRM transitions which differ from each other. FIG. 14 shows calibration lines A, B and C created for three different MRM transitions. Those calibration lines are calibration lines which are all available for the quantitative determination of the same target compound. The calibration-curve evaluating-selecting section 29 selects one calibration line which is expected to yield the most accurate calibration result.

Specifically, the amount of error (e.g. least square error) between each calibration line and the data points (represented by the filled circles, triangles and squares in FIG. 14) used for the creation of the calibration line is calculated. A calibration line which gives the smallest amount of error is considered to be the best calibration line, and is selected.

The selection result, i.e. the MRM transition and the calibration line to be used for the quantitative determination, is presented to the operator through the display unit 6, and is also stored as calibration curve information. This information can be accessed at a later point in time to use signal intensity values on the same MRM transition and refer to the stored calibration line for the quantitative determination of the same kind of target compound.

Needless to say, the pseudo MRM measurement data to be used for the creation of the calibration curve does not always need to be acquired with the mass spectrometer according to the first embodiment; it may be acquired with any of the mass spectrometers according to the second through fourth embodiments.

Sixth Embodiment

Figure 15:
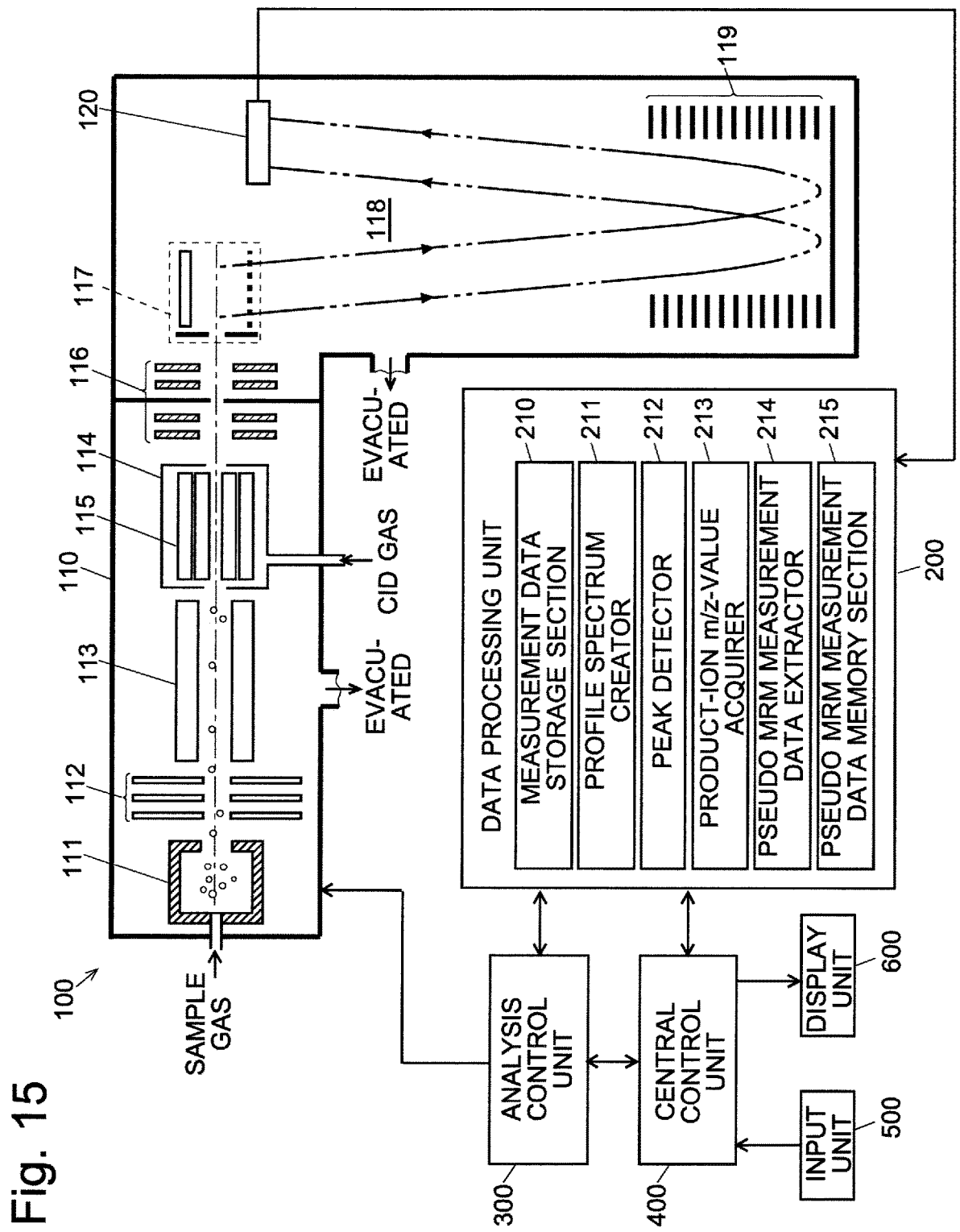
FIG. 15 is a schematic configuration diagram of a mass spectrometer according to the sixth embodiment of the present invention.

A mass spectrometer as the sixth embodiment of the present invention is hereinafter described with reference to FIG. 15. FIG. 15 is a schematic configuration diagram of the mass spectrometer according to the sixth embodiment. Unlike the first through fifth embodiments which are concerned with triple quadrupole mass spectrometers, the sixth embodiment is concerned with a Q-TOF mass spectrometer.

In FIG. 15, the vacuum chamber 110, ion source 111, ion lens 112, front quadrupole mass filter 113, collision cell 114 and multipole ion guide 115 included in the measurement unit 100 are basically identical to the vacuum chamber 10, ion source 11, ion lens 12, front quadrupole mass filter 13, collision cell 14 and multipole ion guide 15 in the mass spectrometer according to the first embodiment shown in FIG. 1.

Ions ejected from the collision cell 114 (e.g. product ions generated by dissociation within the collision cell 114) are introduced into an orthogonal accelerator section 117 through an ion guide 116. The orthogonal accelerator 117 includes an acceleration electrode and accelerates the introduced ions in a direction substantially orthogonal to the direction of their introduction. The accelerated ions are introduced into a flight space 118, which includes an ion reflector 119. While flying within the flight space 118 and being repelled by the ion reflector 119, the ions are spatially separated from each other according to their mass-to-charge ratios before arriving at an ion detector 120. The ion detector 120 produces detections signals corresponding to the amount of ions which sequentially arrive at the detector with the passage of time. The detection signals are converted into digital data by analog-to-digital conversion and sent to a data processing unit 200.

The basic operations of the functional blocks in the data processing unit 200, i.e. the measurement data storage section 210, profile spectrum creator 211, peak detector 212, product-ion m/z-value acquirer 213, pseudo MRM measurement data extractor 214 and pseudo MRM measurement data memory section 215 are the same as those of the measurement data storage section 20, profile spectrum creator 21, peak detector 22, product-ion m/z-value acquirer 23, pseudo MRM measurement data extractor 24 and pseudo MRM measurement data memory section 25 in the mass spectrometer according to the first embodiment shown in FIG. 1. The operations of the analysis control unit 300, central control unit 400 and other related units are also the same as those of the analysis control unit 3 and central control unit 4 in the mass spectrometer according to the first embodiment shown in FIG. 1, except that some of the control operations become different since the controlled object of those operations changes from a quadrupole mass filter to a time-of-flight mass separator.

In the ion detector 120 and the time-of-flight mass separator including the orthogonal accelerator 117, flight space 118 and other components, a time-of-flight mass spectrum which represents a relationship between signal intensity and time of flight for ions whose mass-to-charge ratios fall within a predetermined mass-to-charge-ratio range is obtained by a normal measurement. By converting each value of the time of flight in the time-of-flight spectrum into a mass-to-charge ratio, a mass spectrum can be obtained. It is evident that this mass spectrum corresponds to the profile spectrum in the first embodiment.

That is to say, in the mass spectrometer according to the sixth embodiment, a measurement which corresponds to the process in Step S1 shown in FIG. 2, i.e. a product-ion scan measurement for a specific precursor ion, can be carried out by selecting an ion having a specific mass-to-charge ratio (i.e. precursor ion) by the front quadrupole mass filter 113, dissociating the precursor ion by CID in the collision cell 114, and performing a normal measurement over a predetermined mass-to-charge-ratio range with the time-of-flight mass separator in the rear stage, to eventually acquire a profile spectrum for the product ions. The processes to be performed after the acquisition of the profile spectrum are identical to those of the mass spectrometer in the first embodiment. It is evident that the data processing performed in any of the previously described mass spectrometers according to the second through fourth embodiments can also be applied in the present embodiment.

Thus, a pseudo MRM measurement result for a target compound can also be obtained in the mass spectrometer according to the sixth embodiment.

It should be noted that any of the previously described embodiments is a mere example of the present invention, and any change, addition or modification appropriately made within the spirit of the present invention will evidently fall within the scope of claims of the present application.

For example, although the mass spectrometer according to any of the first through sixth embodiments is a mass spectrometer that can be combined with a gas chromatograph, it is evident that the mass spectrometer may be a mass spectrometer which includes an atmospheric pressure ion source and can be combined with a liquid chromatograph.

REFERENCE SIGNS LIST 1, 100 . . . Measurement Unit
10, 110 . . . Vacuum Chamber
11, 111 . . . Ion Source
12, 112 . . . Ion Lens
13, 113 . . . Front Quadrupole Mass Filter
14, 114 . . . Collision Cell
15, 115 . . . Multipole Ion Guide
16 . . . Rear Quadrupole Mass Filter
17, 120 . . . Ion Detector
116 . . . Ion Guide
117 . . . Orthogonal Accelerator
118 . . . Flight Space
119 . . . Ion Reflector
2A, 2B, 2C, 2D, 2E, 200 . . . Data Processing Unit
20, 210 . . . Measurement Data Storage Section
21, 211 . . . Profile Spectrum Creator
22, 212 . . . Peak Detector
23, 213 . . . Product-Ion m/z-Value Acquirer
24, 214 . . . Pseudo MRM Measurement Data Extractor
241 . . . Product-Ion Intensity-Value Calculator 25, 215 . . . Pseudo MRM Measurement Data Memory Section
26 . . . Centroid Spectrum Creator
27 . . . MS/MS Spectrum Library
28 . . . Product-Ion-Specific Calibration-Curve Creator
29 . . . Calibration Curve Evaluating-Selecting Section
3, 300 . . . Analysis Control Unit
4, 400 . . . Central Control Unit
5 . . . Input Unit
6 . . . Display Unit

The invention claimed is:

1. A mass spectrometer including a front mass separator and a rear mass separator between which a collision cell for dissociating an ion is located, the mass spectrometer further comprising:
  a) a product-ion scan measurement execution controller for controlling each of the front mass separator, the rear mass separator and the collision cell so as to acquire a profile spectrum over a predetermined mass-to-charge-ratio range by executing a product-ion scan measurement in which a known ion originating from a target compound in a sample is designated as a precursor ion;
  b) a peak detector for detecting a peak according to a predetermined criterion on the profile spectrum or on a centroid spectrum derived from the profile spectrum;
  c) a product-ion mass-to-charge-ratio value determiner for determining a mass-to-charge-ratio value of a product ion to be combined with a mass-to-charge-ratio value of the precursor ion and be treated as an MRM transition, based on one or more mass-to-charge-ratio values within a mass-to-charge-ratio range within which the peak or peaks detected from the profile spectrum is present, or based on one or more mass-to-charge-ratio values corresponding to the peak or peaks detected from the centroid spectrum; and
  d) a pseudo MRM measurement result extractor for extracting, as a pseudo MRM measurement result, the mass-to-charge-ratio value of the precursor ion, the mass-to-charge-ratio value of the product ion determined by the product-ion mass-to-charge-ratio value determiner, and an intensity value derived from the peak or peaks detected from the profile spectrum or the centroid spectrum.

2. The mass spectrometer according to claim 1, wherein:
the product-ion mass-to-charge-ratio value determiner determines, as the mass-to-charge-ratio value of the product ion, a mass-to-charge-ratio value which gives a maximum intensity value of the peak detected from the profile spectrum.

3. The mass spectrometer according to claim 1, wherein:
the pseudo MRM measurement result extractor adopts, as the intensity value in the pseudo MRM measurement result, a maximum intensity value of the peak detected from the profile spectrum.

4. The mass spectrometer according to claim 1, wherein:
the pseudo MRM measurement result extractor determines the intensity value in the pseudo MRM measurement result, based on an intensity value or intensity values of the peak or peaks detected from the centroid spectrum related to one peak detected from the profile spectrum.

5. The mass spectrometer according to claim 1, further comprising:
a calibration curve creator for creating a calibration curve showing a relationship between concentration and intensity value, based on pseudo MRM measurement results respectively obtained for the same target compound at different levels of concentration using a same precursor-ion mass-to-charge ratio and a same product-ion mass-to-charge ratio.

6. The mass spectrometer according to claim 5, wherein:
the calibration curve creator creates a plurality of calibration curves based on pseudo MRM measurement results obtained for the same target compound using different precursor-ion mass-to-charge ratios and/or different product-ion mass-to-charge ratios, and selects a calibration curve estimated to be a most reliable among the plurality of calibration curves.

7. The mass spectrometer according to claim 6, further comprising:
an MRM transition extractor for extracting, as an MRM transition, a combination of a precursor ion and a product ion which gives the selected calibration curve.

8. The mass spectrometer according to claim 2, further comprising:
a calibration curve creator for creating a calibration curve showing a relationship between concentration and intensity value, based on pseudo MRM measurement results respectively obtained for the same target compound at different levels of concentration using a same precursor-ion mass-to-charge ratio and a same product-ion mass-to-charge ratio.

9. The mass spectrometer according to claim 3, further comprising:
a calibration curve creator for creating a calibration curve showing a relationship between concentration and intensity value, based on pseudo MRM measurement results respectively obtained for the same target compound at different levels of concentration using a same precursor-ion mass-to-charge ratio and a same product-ion mass-to-charge ratio.

10. The mass spectrometer according to claim 4, further comprising:
a calibration curve creator for creating a calibration curve showing a relationship between concentration and intensity value, based on pseudo MRM measurement results respectively obtained for the same target compound at different levels of concentration using a same precursor-ion mass-to-charge ratio and a same product-ion mass-to-charge ratio.

11. The mass spectrometer according to claim 8, wherein:
the calibration curve creator creates a plurality of calibration curves based on pseudo MRM measurement results obtained for the same target compound using different precursor-ion mass-to-charge ratios and/or different product-ion mass-to-charge ratios, and selects a calibration curve estimated to be a most reliable among the plurality of calibration curves.

12. The mass spectrometer according to claim 9, wherein:
the calibration curve creator creates a plurality of calibration curves based on pseudo MRM measurement results obtained for the same target compound using different precursor-ion mass-to-charge ratios and/or different product-ion mass-to-charge ratios, and selects a calibration curve estimated to be a most reliable among the plurality of calibration curves.

13. The mass spectrometer according to claim 10, wherein:
the calibration curve creator creates a plurality of calibration curves based on pseudo MRM measurement results obtained for the same target compound using different precursor-ion mass-to-charge ratios and/or different product-ion mass-to-charge ratios, and selects a calibration curve estimated to be a most reliable among the plurality of calibration curves.

14. The mass spectrometer according to claim 11, further comprising:
   an MRM transition extractor for extracting, as an MRM transition, a combination of a precursor ion and a product ion which gives the selected calibration curve.

15. The mass spectrometer according to claim 12, further comprising:
   an MRM transition extractor for extracting, as an MRM transition, a combination of a precursor ion and a product ion which gives the selected calibration curve.

16. The mass spectrometer according to claim 13, further comprising:
   an MRM transition extractor for extracting, as an MRM transition, a combination of a precursor ion and a product ion which gives the selected calibration curve.

* * * * *